United States Patent
Hoshina (10) Patent No.: US 10,320,256 B2
(45) Date of Patent: Jun. 11, 2019

(54) METHOD FOR MANUFACTURING STATOR OF ROTARY ELECTRIC MACHINE INCLUDING A CASSETTE COIL

(71) Applicant: TOYOTA JIDOSHA KABUSHIKI KAISHA, Toyota-shi, Aichi-ken (JP)

(72) Inventor: Hiroshi Hoshina, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 184 days.

(21) Appl. No.: 15/230,705

(22) Filed: Aug. 8, 2016

(65) Prior Publication Data

US 2017/0047828 A1 Feb. 16, 2017

(30) Foreign Application Priority Data

Aug. 10, 2015 (JP) ................. 2015-158382

(51) Int. Cl.
- *H02K 15/02* (2006.01)
- *H02K 3/32* (2006.01)
- *H02K 15/04* (2006.01)
- *H02K 3/52* (2006.01)
- *H02K 15/06* (2006.01)

(52) U.S. Cl.
CPC .............. *H02K 3/325* (2013.01); *H02K 3/522* (2013.01); *H02K 15/045* (2013.01); *H02K 15/066* (2013.01)

(58) Field of Classification Search
CPC ........ H01B 13/01209; H01B 13/01227; H02G 1/00
See application file for complete search history.

(56) References Cited

U.S. PATENT DOCUMENTS

| | | | | |
|---|---|---|---|---|
| 7,812,496 B2* | 10/2010 | Sugiura | ............ | H01F 5/02 310/194 |
| 8,390,155 B2* | 3/2013 | Busch | ............ | H02K 3/522 310/12.21 |
| 9,184,638 B2* | 11/2015 | Ueno | ............ | H02K 3/44 |
| 9,762,095 B2* | 9/2017 | McPherson | ............ | H02K 1/148 |
| 2002/0163275 A1* | 11/2002 | Hsu | ............ | H02K 3/18 310/194 |
| 2010/0066198 A1 | 3/2010 | Fubuki et al. | | |
| 2011/0012445 A1* | 1/2011 | Nakanishi | ............ | H02K 3/30 310/43 |
| 2016/0336828 A1 | 11/2016 | Miyamoto et al. | | |
| 2017/0047828 A1* | 2/2017 | Hoshina | ............ | H02K 15/045 |

FOREIGN PATENT DOCUMENTS

| | | |
|---|---|---|
| CN | 101657953 A | 2/2010 |
| JP | 2015-073386 A | 4/2015 |
| JP | 2015139243 A | 7/2015 |
| WO | 2015/050271 A2 | 4/2015 |

* cited by examiner

*Primary Examiner* — Minh Trinh
(74) *Attorney, Agent, or Firm* — Sughrue Mion, PLLC (57) ABSTRACT

A method is for manufacturing a stator of a rotary electric machine. The method includes; forming a stator core; forming each of cassette coils by concentrically winding rectangular wire for the specified number of turns, each of the cassette coils being formed by applying a shift amount with respect to an axis in a winding direction to a wire shape of at least one of the turns before being attached to the teeth; attaching each of the cassette coils to each of teeth while canceling the shift amount; and forming a wire coil of the rotary electric machine by connecting a winding terminal of one of the cassette coils to a winding terminal of another of the cassette coils.

3 Claims, 7 Drawing Sheets

METHOD FOR MANUFACTURING STATOR OF ROTARY ELECTRIC MACHINE INCLUDING A CASSETTE COIL

INCORPORATION BY REFERENCE

The disclosure of Japanese Patent Application No. 2015-158382 filed on Aug. 10, 2015 including the specification, drawings and abstract is incorporated herein by reference in its entirety.

BACKGROUND

1. Field

The present disclosure relates to a method for manufacturing a stator of a rotary electric machine and a cassette coil for a rotary electric machine used therefor.

2. Description of Related Art

As methods for winding a coil that is wound around plural teeth of a stator of a rotary electric machine, concentrated winding in which one-phase wire is wound around one of the teeth and distributed winding in which the one-phase wire is wound across the plural teeth have been known.

It is described in Japanese Patent Application Publication No. 2015-073386 (JP 2015-073386 A) that, as a stator of a three-phase rotary electric machine, a coil piece that is formed by concentrically winding wire formed of rectangular wire is attached to each of plural teeth of the stator, and ends of the coil pieces in the same phase are connected to each other.

The concentrated winding coil can be prepared in advance as the coil piece, in which the wire is wound, in such a manner as to correspond to each of the teeth of a stator core. This is called a cassette coil. In order to assemble the cassette coil to the stator core, an assembly clearance in certain width is required. In the related art, in order to prevent the cassette coil from coming off the stator core because of this assembly clearance, another member having a claw and the like for fixing the cassette coil to the stator core is used.

SUMMARY

The disclosure provides a method for manufacturing a stator of a rotary electric machine capable of fixing a cassette coil to a stator core without using a special fixing member and a cassette coil for a rotary electric machine used therefor.

A method for manufacturing a stator of a rotary electric machine according to one aspect of the present disclosure includes: forming a stator core having teeth that are projected from an annular stator yoke to a radially inner side; forming each of cassette coils by concentrically winding rectangular wire for the specified number of turns, each of the cassette coils being formed by applying a shift amount with respect to an axis in a winding direction to a wire shape of at least one of the turns before being attached to one of teeth; attaching the cassette coils to each of the teeth while canceling the shift amount; and forming a wire coil in the rotary electric machine by connecting winding terminals of the cassette coils to each other.

According to the method for manufacturing the stator of the rotary electric machine having the above configuration, the cassette coil that is formed by concentrically winding the rectangular wire and formed by applying the specified shift amount with respect to the axis in the winding direction to the wire shape of at least one of the turns before being attached to one of the teeth is used. The cassette coil has a property of a coil spring and can have appropriate coil spring elasticity by using the rectangular wire therefor. By using this coil spring elasticity, the cassette coil can be attached while applying a reaction force of the spring elasticity, which is generated by cancellation of the shift amount, to each of the teeth.

A method for manufacturing a stator of a rotary electric machine according to another aspect of the present disclosure includes: forming a stator core having teeth that are projected from an annular stator yoke to a radially inner side; forming each of cassette coils by concentrically winding rectangular wire for the specified number of turns, each of the cassette coils being formed by applying a shift amount with respect to an axis in a winding direction to a wire shape of at least one of the turns before being attached to the stator core; arranging each of insulators on outer circumferential side surfaces of each of the teeth, the insulator having a cylindrical shape and held between an inner circumferential side surface of the cassette coil and the outer circumferential side surface of each of the teeth that opposes the inner circumferential side surface of the cassette coil, and the insulator being provided with a step on an outer side surface of said cylindrical shape that corresponds to an inner circumferential side surface of each of the turns of the rectangular wire; bringing the inner circumferential side surface of each of the turns of the rectangular wire into contact with the step of each of the insulators while canceling the shift amount, and attaching each of the cassette coils; and forming a specified wire coil in the rotary electric machine by connecting winding terminals of the cassette coils to each other.

According to the method for manufacturing the stator of the rotary electric machine having the above configuration, the cassette coil is attached to the stator core in such a manner that the inner circumferential side surface of each of the turns of the rectangular wire of the cassette coil is fitted to the step of the insulator. In this way, an elastic reaction force as that of a coil spring using the rectangular wire can reliably be applied to the insulator.

In the method for manufacturing the stator of the rotary electric machine according to the one aspect of the present disclosure, the shift amount of the wire shape may be a magnitude of a twisting angle with respect to the axis in the winding direction.

According to the method for manufacturing the stator of the rotary electric machine having the above configuration, a specified twisting angle with respect to the axis in the winding direction is applied to the wire shape of at least one of the turns before attachment to the tooth or the insulator. In this way, an elastic reaction force that is generated by cancellation of the twisting angle of the wire can be applied to the tooth or the insulator.

In the method for manufacturing the stator of the rotary electric machine according to the one aspect of the present disclosure, the shift amount of the wire shape may be a displacement amount along a circumferential direction of the stator core with respect to the axis in the winding direction.

According to the method for manufacturing the stator of the rotary electric machine having the above configuration, a specified displacement amount along the circumferential direction of the stator core with respect to the axis in the winding direction is applied to the wire shape of at least one of the turns before the attachment to the tooth or the insulator. In this way, an elastic reaction force that is generated by cancellation of the displacement amount of the wire can be applied to the tooth or the insulator.

A cassette coil for a rotary electric machine according to one aspect of the present disclosure includes rectangular wire. The rectangular wire is concentrically wound for the specified number of turns. The rectangular wire is wound by applying a shift amount with respect to an axis in a winding direction to a wire shape of at least one of the turns before being attached to a stator core of a stator of the rotary electric machine.

According to the cassette coil for the rotary electric machine having the above configuration, the cassette coil is formed by applying the specified shift amount with respect to the axis in the winding direction to the wire shape of at least one of the turns before being attached to the stator core. The cassette coil has the property of the coil spring and can have the appropriate coil spring elasticity by using the rectangular wire therefor. By using this coil spring elasticity, the cassette coil can be attached while applying the reaction force of the spring elasticity, which is generated by the cancellation of the shift amount, to the stator core.

According to the aspects of the present disclosure, the cassette coil can be fixed to the stator core without using the special fixing member.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

A detailed description will hereinafter be made on an embodiment according to the present disclosure by using the drawings. As a stator of a rotary electric machine that is manufactured by a method for manufacturing the stator of the rotary electric machine, a stator that is used for a rotary electric machine mounted in a vehicle will hereinafter be described. However, it should be understood as an exemplification written for the purpose of explanation. Application of the stator of the rotary electric machine may not have be vehicle installation as long as a concentrically wound cassette coil is used. Shapes, dimensions, the number of teeth, the number of turns, materials, and the like, which will be described below, are merely illustrative for explanation purposes and thus can appropriately be changed in accordance with a specification of the stator of the rotary electric machine. In the following description, similar components are denoted by the same reference numeral in all of the drawings, and the description thereon will not be repeated.

Figure 1:
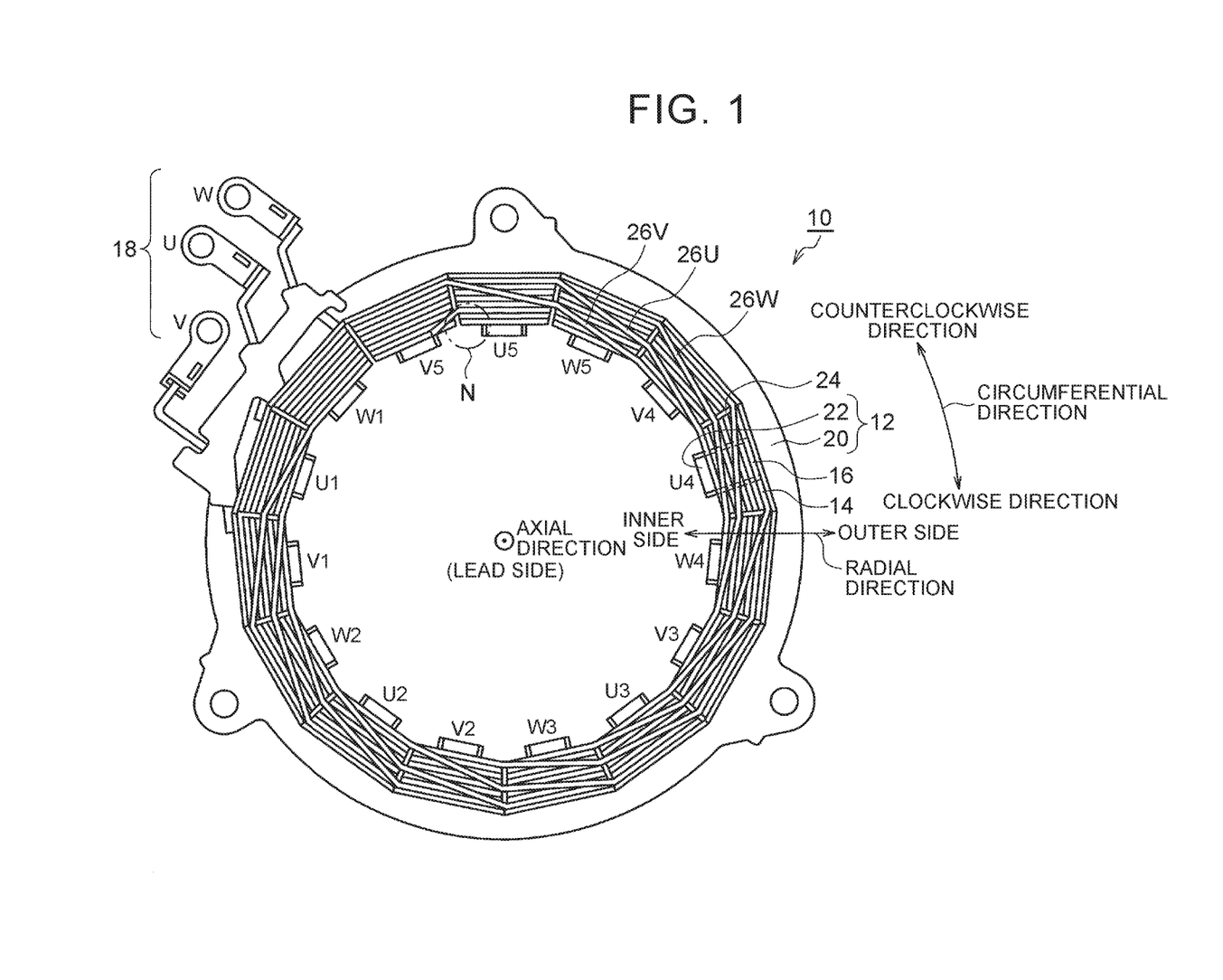
FIG. 1 is a top view of a stator of a rotary electric machine that is manufactured by a method for manufacturing the stator of the rotary electric machine in an embodiment according to the present disclosure, in which the stator is seen from a lead side as an axial direction in which a power line is drawn.

FIG. 1 is a view of a configuration of a rotary electric machine stator 10 that is used for a rotary electric machine mounted in a vehicle, as the stator of the rotary electric machine that is manufactured by the method for manufacturing the stator of the rotary electric machine, which will be described below. Unless otherwise noted, the rotary electric machine stator 10 will hereinafter be referred to as a stator 10. A power line 18 to be connected to a drive circuit, which is not shown, is drawn from the stator 10. The rotary electric machine, for which the stator 10 is used, is a motor generator that functions as a motor during power running of the vehicle and that also functions as a generator during braking of the vehicle through control of the drive circuit, and is a three-phase synchronous rotary electric machine. The rotary electric machine is configured by including: the stator 10 as a stator shown in FIG. 1; and a rotor as an annular rotor that is disposed on a radially inner side of the stator 10 with a specified clearance being provided therebetween. The rotor is not shown in FIG. 1.

FIG. 1 is a top view of the stator 10 that is seen from a lead side in an axial direction. Of both sides of the stator 10 in the axial direction, the lead side is a side on which the power line 18 is drawn from the stator 10. An opposite side from the lead side in the axial direction is an anti-lead side. FIG. 1 shows a circumferential direction, the radial direction, and the axial direction of the stator 10. Both side directions in the circumferential direction are a right-handed direction and a left-handed direction in the top view of the stator 10 that is seen from the lead side. Hereinafter, the right-handed direction will be referred to as a clockwise direction, and the left-handed direction will be referred to as a counterclockwise direction. Both side directions in the radial direction are an inner-side direction and an outer-side direction of a stator core 12. Both side directions in the axial direction are a lead side direction and an anti-lead side direction.

The stator 10 is configured by including the stator core 12, a cassette coil 14 that is attached to the stator core 12, and an insulator 16 that is arranged between the stator core 12 and the cassette coil 14.

The stator core 12 is an annular magnetic component and includes an annular stator yoke 20 and plural teeth 22 that are projected from the stator yoke 20 to the radially inner side. A space between the adjacent teeth 22 is a slot 24. The tooth 22 is a projected section to which the cassette coil 14 is attached and which thereby serves as a magnetic pole.

Such a stator core 12 is formed by stacking plural pieces of annular thin magnetic sheets 28 (see FIG. 2), and each of the annular thin magnetic sheets 28 is molded in a specified shape such that the stator yoke 20 and the tooth 22 are provided and that the slot 24 is formed. Both surfaces of the thin magnetic sheet 28 are subjected to electrical insulation treatment. An electromagnetic steel sheet can be used as a material of the thin magnetic sheet 28. Instead of a stacked body of the thin magnetic sheets, an article that is formed by integrally molding magnetic powder in the specified shape may be used.

The cassette coil 14 is a concentrically wound coil and is formed by winding one-phase wire around one of the teeth 22 for the specified number of turns. The cassette coil 14 of a different phase is arranged in the one slot 24 between the adjacent teeth 22.

Such a cassette coil 14 is a coil piece that is formed by winding lead wire with an insulation film for the specified number of turns by using a specified coil former and removing the wound lead wire from the coil former. The lead wire with the insulation film is not directly wound around the tooth 22 of the stator 10 by using the slots 24 as the spaces on both sides of the tooth 22. Instead, the cassette coil 14 that is the coil piece as a separate component from the stator core 12 is fitted and attached to the tooth 22. The cassette coil 14 is the coil piece that is formed with the lead wire on which insulation film is placed. This cassette coil 14 is a single coil formed by a method described below, in which a bobbin or the like is not used.

As element wire of the lead wire with the insulation film for the cassette coil 14, copper wire, copper-tin alloy wire, silver-plated copper-tin alloy wire, or the like can be used. As the element wire, rectangular wire having a substantially rectangular cross-sectional shape is used. As the insulation film, an enamel film of polyamide-imide is used. Instead of this, polyester-imide, polyimide, polyester, formal, or the like can be used.

One unit of the cassette coil 14 is attached to each of the teeth 22 of the stator core 12. In an example of FIG. 1, the stator core 12 has five U-phase teeth 22, five V-phase teeth 22, and five W-phase teeth 22, and one unit of the cassette coil 14 is attached to each one of these fifteen teeth 22. In FIG. 1, the teeth 22, to which the cassette coils 14 are respectively attached, are shown as U1 to U5 used for a U-phase, V1 to V5 used for a V-phase, and W1 to W5 used for a W-phase.

In the three-phase synchronous rotary electric machine, groups of the U-phase coil, the V-phase coil, and the W-phase coil, are sequentially arranged along the circumferential direction of the stator core 12. For example, the five U-phase cassette coils 14 are arranged along the circumferential direction of the stator core 12 while separating from each other at intervals of three teeth. Similarly, the five V-phase cassette coils 14 are also arranged along the circumferential direction of the stator core 12 while separating from each other at intervals of three teeth, and the five W-phase cassette coils 14 are also arranged along the circumferential direction of the stator core 12 while separating from each other at intervals of three teeth.

Each of the cassette coils 14 has a winding start end and a winding finish end of the wire. In the five cassette coils 14 of the same phase that are arranged along the circumferential direction of the stator core 12, the winding start end of the first cassette coil 14 is connected to the power line 18. The winding finish end of the first cassette coil 14 is connected to the winding start end of the second cassette coil 14, which separates therefrom at the interval of the three teeth, by jumper wire 26. The winding finish end of the second cassette coil 14 is connected to the winding start end of the third cassette coil 14, which separates therefrom at the interval of the three teeth, by the jumper wire 26. This process is repeated, and the winding finish end of the last fifth cassette coil 14 is connected to the winding finish end of each of the fifth cassette coils 14 of the other two phases and serves as a neutral point N. In FIG. 1, the jumper wire 26 for each of the phases is distinguished from each other and is shown as U-phase jumper wire 26U, V-phase jumper wire 26V, and W-phase jumper wire 26W.

For example, as to the U-phase wire coils, a U terminal of the three power lines 18 is connected to the winding start end of the cassette coil 14 of U1. The winding finish end thereof and the winding start end of the cassette coil 14 of U2 are connected by the jumper wire 26U. The winding finish end of the cassette coil 14 of U2 and the winding start end of the cassette coil 14 of U3 are connected by another jumper wire 26U. This process is repeated, and the winding finish end of the cassette coil 14 of U5 serves as the neutral point N. The same applies to the V-phase wire coils and the W-phase wire coils. Just as described, the winding start ends and the winding finish ends as winding terminals of the cassette coils 14 are connected to each other by a specified connection method, so as to form three-phase wire coils in the rotary electric machine. In this way, five U-phase magnetic poles that correspond to U1 to U5, five V-phase magnetic poles that correspond to V1 to V5, and five W-phase magnetic poles that correspond to W1 to W5 are formed.

The insulator 16 is an insulation body having a cylindrical shape that is held between an inner circumferential side surface of the cassette coil 14 and an outer circumferential side surface of the tooth 22 that opposes the inner circumferential side surface of the cassette coil 14. The insulator 16 is fixed to the stator core 12 by fixing means such as adhesion. As such an insulator 16, an article that is formed by molding a sheet having an electrical insulation property into a specified shape can be used. As the sheet having the electrical insulation property, in addition to paper, a plastic film can be used. Details of the insulator 16 will be described below. Note that, in the case where electrical insulation performance of the insulation film of the cassette coil 14 is sufficient, and the like, the insulator 16 may not be used. Unless otherwise noted, the insulator 16 will be used below.

The concentrically wound coil is wound in a specified annular shape while the lead wire is bent. Accordingly, depending on rigidity of the lead wire, like a coil spring, an elastic reaction force that urges the coil to return to an original lead wire shape is exerted in the circumferential direction and the radial direction. In this embodiment, the cassette coil 14 is fixed to the stator core 12 by actively using this elastic reaction force as the coil spring.

Figure 2:
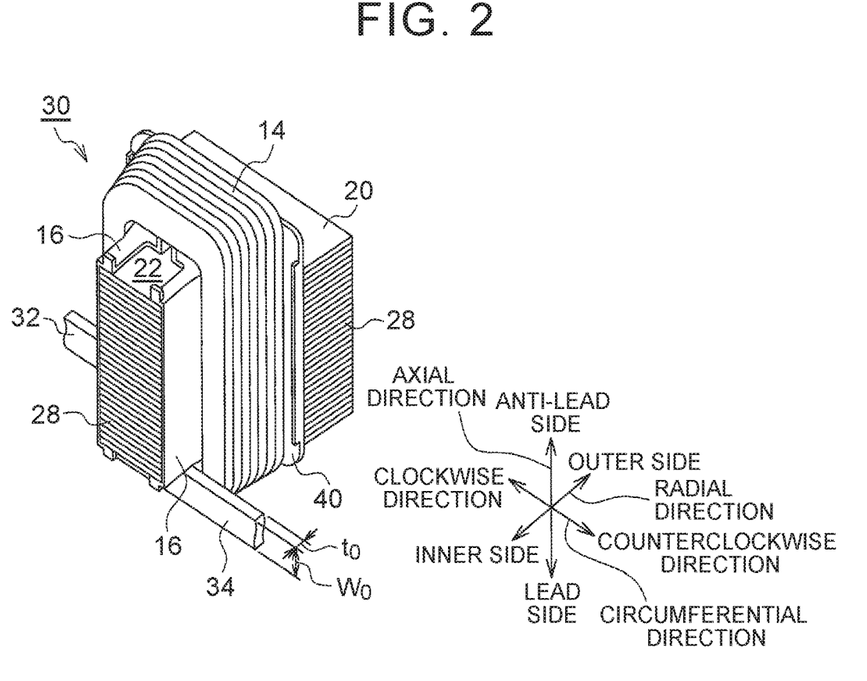
FIG. 2 is a perspective view of a cassette coil that is wound around one tooth and that is seen from an inner side in a radial direction with the lead side in FIG. 1 being a lower side.

FIG. 2 is a view in which a magnetic pole 30 corresponding to U4 in FIG. 1 is taken out, in which the axial direction is vertically reversed and the lead side is shown as a lower side of the sheet to illustrate a winding method.

The tooth 22 is projected from the stator yoke 20 to the radially inner side, and a cross-sectional shape thereof that is parallel to a surface along the circumferential direction is a rectangular shape. The stator yoke 20 and the tooth 22 are formed by stacking the thin magnetic sheets 28 in the same shape. Thus, height dimensions of the stator yoke 20 and the tooth 22 along the axial direction are the same. Depending on a specification of the stator 10, electromagnetic steel sheets of different types may be used for the stator yoke 20 and the tooth 22, so as to make the height dimensions thereof differ from each other.

The cassette coil 14 shown in FIG. 2 is being fitted to an outer side surface of the insulator 16. Thus, to distinguish the cassette coil 14 from a cassette coil 60 (see FIG. 3C) as a pre-attachment coil piece, the cassette coil 14 may be referred to as a post-attachment cassette coil 14. The rectangular wire in width $W_0$ and thickness $t_0$ is used for the cassette coil 14, and the cassette coil 14 is being wound around an axis in a winding direction for the specified number of turns with a thickness direction as the radial direction. A wire shape of each of the turns of the rectangular wire is an annular rectangular shape in which four corners are rounded. The axis in the winding direction is an axis that is parallel to the radial direction, and is an axis that passes through the center of the annular rectangular shape that is the wire shape of each of the turns. (The width $W_0$/the thickness $t_0$) of the rectangular wire falls within a range over 1 to approximately 3. Depending on the specification of the stator 10, (the width $W_0$/the thickness $t_0$) of the rectangular wire may have a value(s) other than the above.

A winding start end 32 of the post-attachment cassette coil 14 is located near an intersection of a lead-side end of the tooth 22 and a radially outer-side end of the tooth 22. The rectangular wire is wound around the axis in the winding direction from the winding start end 32 in the counterclockwise direction with seven turns. The axis in the winding direction is the axis that is parallel to the radial direction. A winding finish end 34 after the seven turns is located near an intersection of the lead-side end and a radially inner-side end of the tooth 22. Of four sides of the annular rectangular shape as the wire shape of each of the turns, two sides are parallel to the axial direction, and the other two sides are parallel to the circumferential direction. Note that, along the radial direction, the radially inner-side end of the tooth 22 and a radially inner-side end of the insulator 16 are further projected to the radially inner side from a radially inner-side end of the cassette coil 14.

FIG. 3A to FIG. 3D show relationships among the tooth 22, the insulator 16, the post-attachment cassette coil 14 to the insulator 16, and the pre-attachment cassette coil 60 to the insulator 16.

Figure 3A:
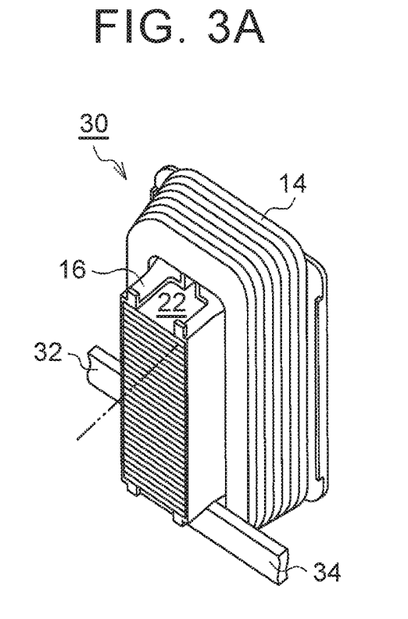
FIG. 3A is a view in which a stator yoke is removed from FIG. 2.
Figure 3B:
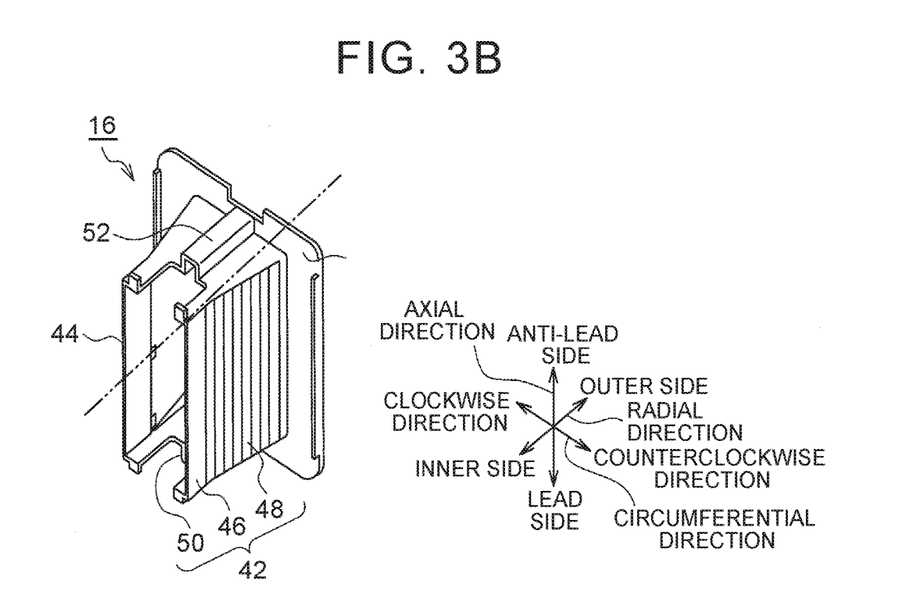
FIG. 3B is a perspective view of an insulator that is taken out from FIG. 3A.
Figure 3C:
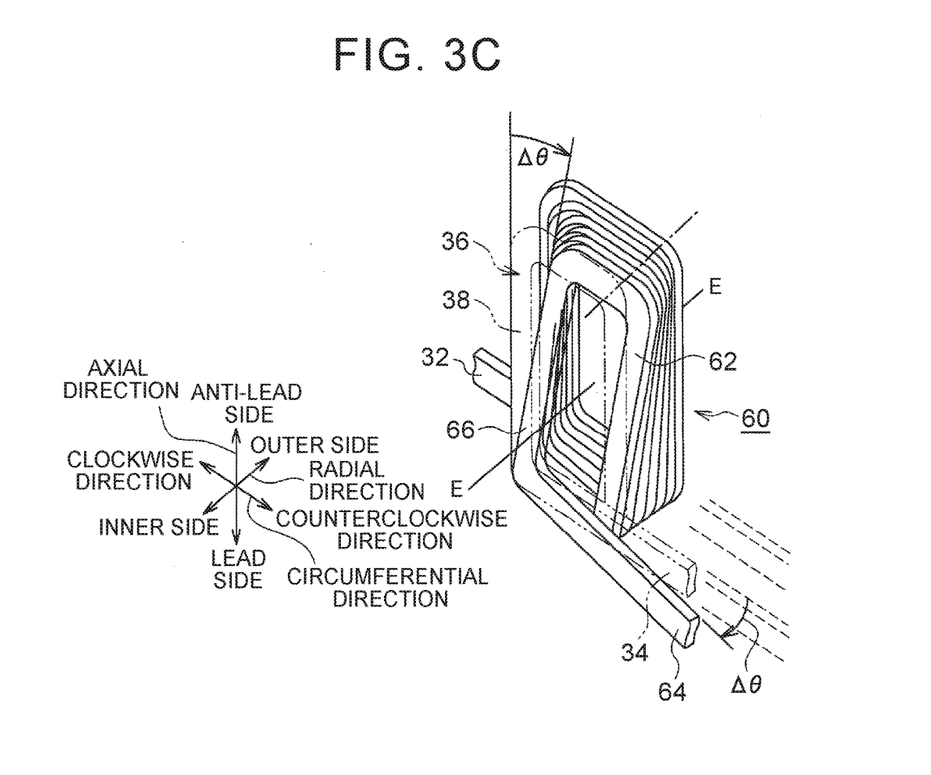
FIG. 3C is a perspective view of the cassette coil before being wound around a stator core in FIG. 3A.
Figure 3D:
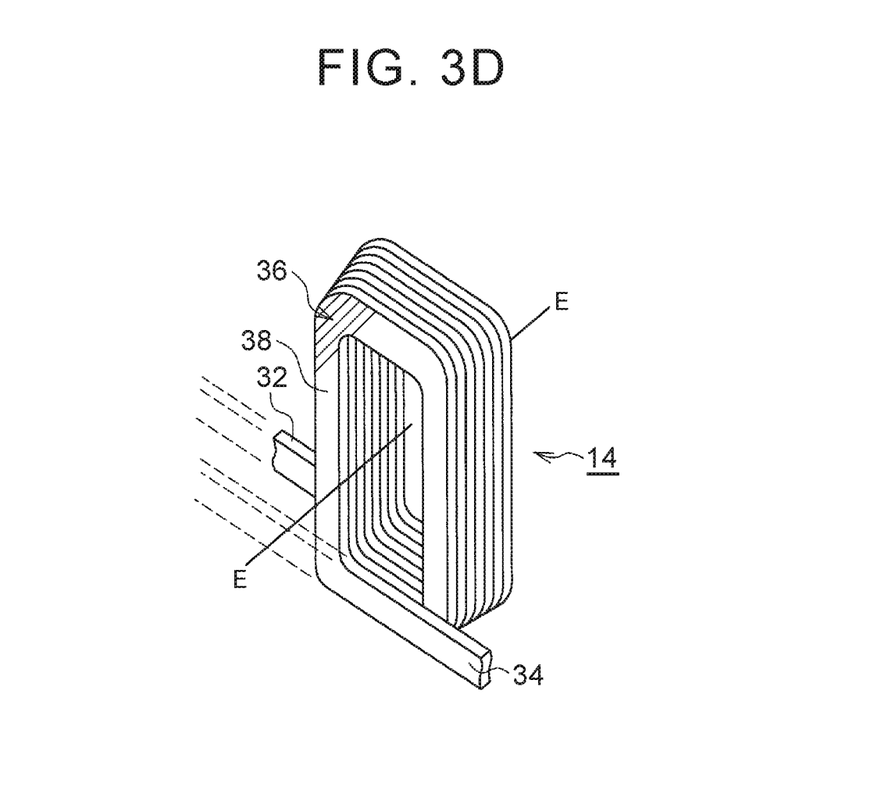
FIG. 3D is a perspective view of a state when the cassette coil in FIG. 3C is attached to the stator core via the insulator in FIG. 3B.

FIG. 3A is a view of the magnetic pole 30 in which the stator yoke 20 in FIG. 2 is not shown, and corresponds to a view in which the insulator 16 and the cassette coil 14 are assembled to the tooth 22. FIG. 3B is a perspective view of the insulator 16 that is obtained by exploding FIG. 3A. FIG. 3C is a perspective view of the pre-attachment cassette coil 60. FIG. 3D is a perspective view of the post-attachment cassette coil 14 that is obtained by exploding FIG. 3A. In FIG. 3A to FIG. 3C, a position corresponding to the insulator 16 is shown by connecting two-dot chain lines. In FIG. 3C and FIG. 3D, positions corresponding to the winding start end 32 and the winding finish end 34 are shown by connecting broken lines.

The insulator 16 shown in FIG. 3B has a back surface sheet section 40 for electrically insulating the cassette coil 14 and the stator yoke 20 from each other. Furthermore, the insulator 16 has a side wall sheet section 42 that is connected to the back surface sheet section 40 and insulates the inner circumferential side surface of the cassette coil 14 and the outer circumferential side surface of the tooth 22 that opposes the inner circumferential side surface of the cassette coil 14 from each other. The back surface sheet section 40 has an opening through which the tooth 22 passes, and the side wall sheet section 42 is provided by being connected to an edge of the opening. The side wall sheet section 42 is a cylindrical member that makes one turn along the outer circumferential side surface of the tooth 22.

The tooth 22 is a projected section whose cross-sectional shape that is perpendicular to the radial direction is the rectangular shape. Within a range of the rectangular cross-sectional shape where the cassette coil 14 is attached, a side at a tip of the tooth 22 that is along the circumferential direction is shorter than a side in a root section on the stator yoke 20 side that is along the circumferential direction. That is, the tooth 22 has a tapered shape within the range where the cassette coil 14 is attached. In the radial direction, in a portion that is projected to the radially inner side from the range where the cassette coil 14 is attached, length of the tooth 22 along the circumferential direction is constant. Corresponding to this shape of the tooth 22, the side wall sheet section 42 of the insulator 16 has a shape that is tapered toward the tip side within a range where the cassette coil 14 is attached. In a portion that is projected to the tip side from the range where the cassette coil 14 is attached, length of the insulator 16 along the circumferential direction is constant.

The inner circumferential side surface of the rectangular wire of each of the turns of the cassette coil 14 in an attached state comes in contact with an outer side surface of a side wall sheet 44 on the clockwise direction side and an outer side surface of a side wall sheet 46 on the counterclockwise direction side in the circumferential direction in the side wall sheet section 42 of the insulator 16. Within the range where the cassette coil 14 is attached, the insulator 16 is tapered toward the tip side. Accordingly, when the rectangular wire that has the substantially rectangular cross-sectional shape is brought into contact with the outer side surface of the tapered insulator 16, a clearance is formed between the inner circumferential side surface of the rectangular wire and the outer side surface of the insulator 16. In order to prevent generation of this clearance, a stair-shaped step 48 whose shape follows the inner circumferential side surface of each of the turns of the rectangular wire is provided. In this way, when the cassette coil 14 is attached, the rectangular wire of each of the turns of the cassette coil 14 is aligned and arranged along the steps 48 on the outer side surfaces of the side wall sheets 44, 46 of the insulator 16 without generating the unnecessary clearance.

In the side wall sheet section 42 of the insulator 16, a bulged section 50 that is bulged to the lead side and a bulged section 52 that is bulged to the anti-lead side in the axial direction are provided to secure a bending radius that is used when the rectangular wire is bent in the annular rectangular shape. The inner circumferential side surface of the rectangular wire of each of the turns of the cassette coil 14 comes in contact with bulged outer side surfaces of the bulged sections 50, 52.

In the pre-attachment cassette coil 60 shown in FIG. 3C, the rectangular wire is wound around the axis in the winding direction from the winding start end 32 in the counterclockwise direction with seven turns, and this is the same as the post-attachment cassette coil 14. (E-E) is an axis in the winding direction and is an axis that is parallel to the radial direction and passes through the center of the wire shape of the rectangular wire of each of the turns. The axis (E-E) in the winding direction is also an axis that is parallel to the radial direction and passes through the center of the cross-sectional shape of the tooth 22 that is perpendicular to the radial direction. In the pre-attachment cassette coil 60, when being wound with seven turns around the axis (E-E) in the winding direction, the wire shape of each of the turns is twisted around the axis (E-E) in the winding direction at a specified twisting angle Δθ. The twisting angle Δθ is an angle at a time when the wire shape is twisted around the axis (E-E) in the winding direction at a small angle when the cassette coil 60 is seen as the coil spring. The twisting angle Δθ is an angle of a few degrees and thus differs from a rotational angle that has an angle of 360 degrees per turn. The twisting angle Δθ is an angle at a time when the wire shape of each of the turns is not changed and the entire wire shape is twisted around the axis (E-E) in the winding direction. The twisting angle Δθ in seven turns are different one another.

As for the post-attachment cassette coil 14, the twisting angle Δθ equals 0 degree. Accordingly, the twisting angle Δθ corresponds to an angular difference around the axis (E-E) in the winding direction between the wire shape of each of the turns in the post-attachment cassette coil 14 and the wire shape of each of the turns in the pre-attachment cassette coil 60.

In view of the above, the twisting angle Δθ will be described by comparing the pre-attachment cassette coil 60 and the post-attachment cassette coil 14. FIG. 3D is a view, in which the cassette coil 14 attached to the magnetic pole 30 is taken out. When being taken out of the magnetic pole 30, the cassette coil 14 returns to the state of the pre-attachment cassette coil 60 in FIG. 3C. Note that FIG. 3D shows the cassette coil 14 in the state of being attached to the magnetic pole 30.

In FIG. 3D, diagonal lines are added to a portion of a wire shape 36 of the rectangular wire in one turn that is on the innermost side in the radial direction of the seven turns. The wire shape 36 includes: a side that has the winding finish end 34 and is parallel to the circumferential direction; and a side 38 that is before the said side and is parallel to the axial direction. An angle between these two sides is 90 degrees.

The two-dot chain lines in FIG. 3C indicate a portion corresponding to the wire shape 36 in FIG. 3D, a portion including the side that has the winding finish end 34 and is parallel to the circumferential direction, and the side 38 that is before the said side and is parallel to the axial direction. A wire shape 62 of the rectangular wire in the one turn that is on the innermost side in the radial direction of the seven turns of the pre-attachment cassette coil 60 to the magnetic pole 30 includes: a side that has a winding finish end 64 and is parallel to the circumferential direction; and a side 66 that is right before the said side and is parallel to the axial direction.

Here, the twisting angle Δθ relates to the wire shape of the rectangular wire in the one turn that is on the innermost side in the radial direction of the seven turns. In regard to the side that is parallel to the axial direction, the twisting angle Δθ is an angular difference that is generated when the side 38 of the post-attachment cassette coil 14 and the side 66 of the pre-attachment cassette coil 60 overlap each other. In regard to the side that is parallel to the circumferential direction, the twisting angle Δθ is an angular difference that is generated when the side that has the winding finish end 34 of the post-attachment cassette coil 14 and the side that has the winding finish end 64 of the pre-attachment cassette coil 60 overlap each other. Even when being applied with the twisting angle Δθ, the wire shape 62 is not changed from the wire shape 36. The relationship "the wire shape 62=the wire shape 36" remains the same, and the wire shape 62 is only rotated at the twisting angle Δθ, which is a slight angle within a surface along the circumferential direction.

The twisting angles Δθ in the seven turns of the rectangular wire are different one another. If the seven turns of the rectangular wire are distinguished one by one, the first turn that includes the winding start end 32 is set as (N=1) and the seventh turn that includes the winding finish end 64 is set as (N=7), then the twisting angle Δθ of the (N=1) turn is the smallest and the twisting angle Δθ of the (N=7) turn is the largest. In the example of FIG. 3C, a twisting angle Δθ (N=1) of the first turn is 0 degree, and a twisting angle Δθ (N=7) of the seventh turn is approximately 10 degrees. For the second turn to the sixth turn, the twisting angle is gradually increased within a range from 0 degree to 10 degrees.

In a state where the specified twisting angle Δθ is applied to the wire shape of each of the turns of the rectangular wire, the pre-attachment cassette coil 60 is wound around the axis (E-E) in the winding direction, and is fixed and formed in such a shape. As a method for fixing the shape, an appropriate press molding method can be used. The pre-attachment cassette coil 60 is attached to the tooth 22 via the insulator 16 in FIG. 3B. At the time, each of the turns of the rectangular wire is attached in such a manner as to follow the step 48 of the insulator 16.

Because the cassette coil 60 has elasticity as the coil spring, the twisting angle of the wire of each of the turns is canceled by the attachment. For example, in a case of the seventh turn, a wire portion having the wire shape 62, to which the twisting angle Δθ is applied, is attached to the tooth 22 via the insulator 16. Accordingly, the seventh turn elastically returns as the wire portion having the wire shape 36. The elastic reaction force at this time is applied to the step 48 of the insulator 16. In this way, the cassette coil 14 is fixed to the stator core 12 via the insulator 16 without using a special fixing member.

Figure 4:
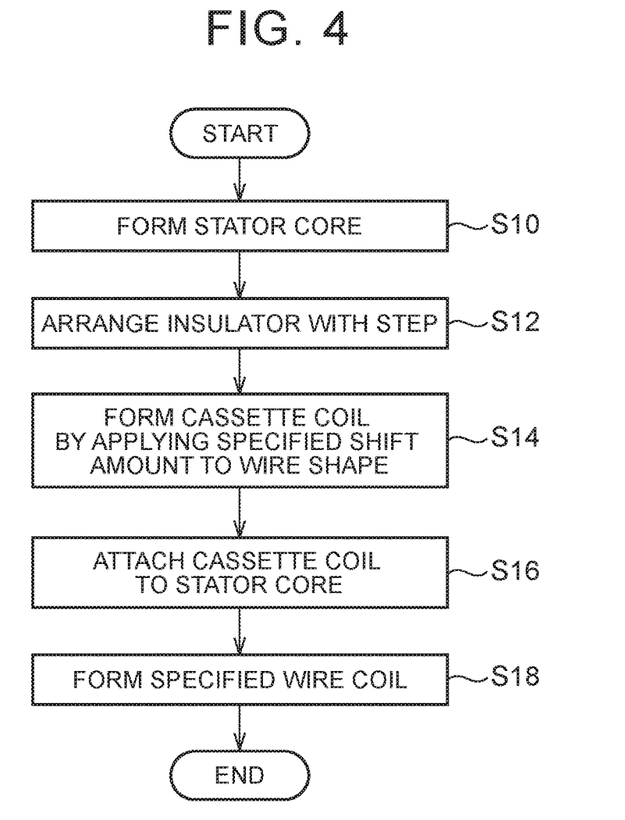
FIG. 4 is a flowchart that shows each process of the method for manufacturing the stator of the rotary electric machine in the embodiment according to the present disclosure.

A detailed description will hereinafter be made on a method for manufacturing the stator 10 of the above configuration by using FIG. 4 onward. FIG. 4 is a flowchart that shows each process of the method for manufacturing the stator 10. Here, the stator core 12 is formed (S10). The stator core 12 is formed by stacking the specified number of pieces of the annular thin magnetic sheets 28 that are molded in the specified shape. The electromagnetic steel sheet, both surfaces of which are subjected to the electrical insulation treatment, is used as the thin magnetic sheet 28.

Next, the insulator 16 with the step 48 described by using FIG. 3B is arranged in each of the teeth 22 of the stator core 12 (S12). S12 is performed by fitting the insulator 16 from the tip side of each of the teeth 22.

Concurrently with S10 and S12 or prior to these, the pre-attachment cassette coil 60 is formed (S14). In S14, the pre-attachment cassette coil 60 is formed by using the rectangular wire as described by using FIG. 3C and by winding each of the turns while the twisting angle Δθ of the wire of each of the turns with respect to the axis (E-E) in the winding direction during winding around the tooth 22 is shifted from each other.

Figure 5A:
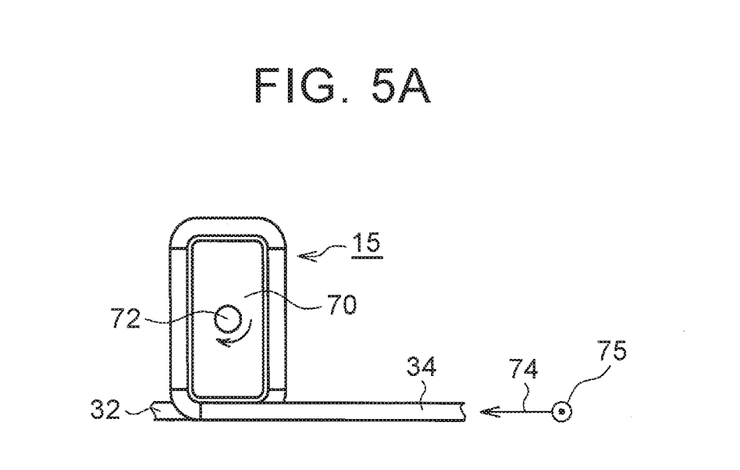
FIG. 5A is a view showing a method for winding a cassette coil of the related art as a comparative example.
Figure 5B:
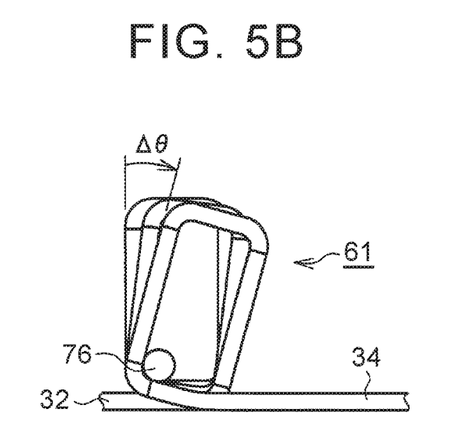
FIG. 5B is a view showing a method for winding the cassette coil for the rotary electric machine in the embodiment according to the present disclosure.

FIG. 5A and FIG. 5B are views of a method for forming a pre-attachment cassette coil in comparison with the related art. In these views, the tooth has the same cross section along the radial direction.

FIG. 5A is a view of one example of a method for manufacturing a concentrically wound cassette coil 15 in the related art. In the related art, a coil former 70 that has a predetermined cross-sectional shape is used for winding. The coil former 70 can rotate about a shaft 72 in the winding direction. Here, the winding start end 32 of the rectangular wire is fixed at an appropriate position of the coil former 70 and is arranged along an outer circumference of the coil former 70. Then, the coil former 70 rotates in a direction of an arrow in FIG. 5A about the shaft in the winding direction while feeding the rectangular wire along a feeding direction 74 indicated by the arrow. Feeding in the feeding direction 74 includes feeding in the radial direction and feeding in the circumferential direction in accordance with the advancement of winding. In this way, the rectangular wire is wound in a spiral shape along the outer circumference of the coil former 70. A winding guide groove in the spiral shape may be provided in the coil former 70.

In the method for forming the pre-attachment cassette coil 60 described by using FIG. 3C, a coil former for twisting formation that has the twisting angle Δθ for each of the turns is prepared. Each of the turns of the rectangular wire is wound in a similar method to that in FIG. 5A by using the coil former for the twisting formation. In this way, the pre-attachment cassette coil 60 described by using FIG. 3C can be formed.

FIG. 5B is a view of another method for applying the twisting angle Δθ to the wire shape of each of the turns. A cassette coil 61 in FIG. 5B is formed by performing an additional process on the cassette coil 15 that is formed by the method shown in FIG. 5A. As the additional process, a twisting support shaft 76 is applied to one of round portions at corners of the cassette coil 15, and the wire shape of each of the turns is twisted around the twisting support shaft 76 at the specified twisting angle Δθ. Here, "twisting" means that, as described by using FIG. 3C, the wire shape is rotated at the slight angle and is stopped at a rotated position. In the example of FIG. 3C, the twisting angle Δθ of the seventh turn is approximately 10 degrees. As a method for fixing the twisted shape, the appropriate press molding method can be used.

Figure 6:
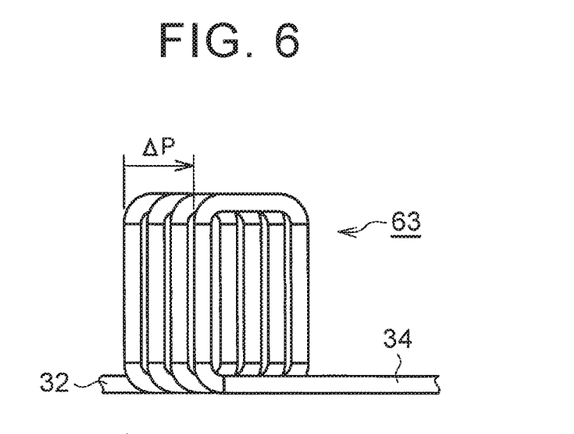
FIG. 6 is a view showing another method for winding the cassette coil for the rotary electric machine in the embodiment according to the present disclosure.

The above pre-attachment cassette coils 60, 61 are each formed by applying the twisting angle Δθ to the wire shape of each of the turns. However, a method other than the above may be adopted. For example, the pre-attachment cassette coil may be formed by a method, in which an initial distortion of a specified shift amount is applied to the wire shape of each of the turns with respect to the axis in the winding direction. For a cassette coil 63 in FIG. 6, the cassette coil 15 that is formed by the method shown in FIG. 5A is used, and, as the specified shift amount, a specified displacement amount ΔP in the circumferential direction is applied to the wire shape of each of the turns. The displacement amount ΔP in turns are different one another. The displacement amount ΔP of the first (N=1) turn counting from the winding start end 32 is the smallest. The displacement amount ΔP is increased as N indicative of the number of the turn is increased, and the displacement amount ΔP of the seventh (N=7) turn is the largest. As a method for fixing a shape, to which the displacement amount is applied, the appropriate press molding method can be used.

In the above description, the twisting angle Δθ is set as an angle in the clockwise direction when seen from the inner sides of the cassette coils 60, 61 in the radial direction; however, this may be set as an angle in the counterclockwise direction. In addition, the displacement amount ΔP of the cassette coil 63 is set as a displacement amount in the clockwise direction along the circumferential direction; however, this may be set as a displacement amount in the counterclockwise direction along the circumferential direction. Furthermore, the twisting angle Δθ and the displacement amount ΔP may be combined. In the above description, the twisting angle Δθ and the displacement amount ΔP in turns are different one another; however, the twisting angle Δθ and the displacement amount ΔP may differ in a portion of each of the turns from those in the rest of the portion of each of the turns. The twisting angle Δθ and the displacement amount ΔP are applied to the wire shape of at least one of the turns. For example, the twisting angle Δθ or the displacement amount ΔP may be applied only to the seventh turn on the innermost side in the radial direction. Note that the number of the turns is seven in the above description; however, the number of the turns may be other than seven.

Returning to FIG. 4, next, the cassette coil 60 that is formed in S14 is attached to the stator core 12 (S16). Here, the cassette coil 60 is attached to the insulator 16 that is arranged in the stator core 12 in S12. Instead of the cassette coil 60, the cassette coil 61 in FIG. 5B or the cassette coil 63 in FIG. 6 may be used. In the cassette coil 60 that remains the same as that formed in S12, the wire shape of each of the turns is applied with the specified shift amount and has the initial distortion. The cassette coil 60 is attached as follows; the cassette coil 60 is fitted from the tip sides of the tooth 22 and the insulator 16, and the inner circumferential side surface of each of the turns of the rectangular wire is aligned and brought into surface contact with the step 48 on the outer side surface of the insulator 16 while canceling shift of the wire shape of each of the turns.

Figure 7A:
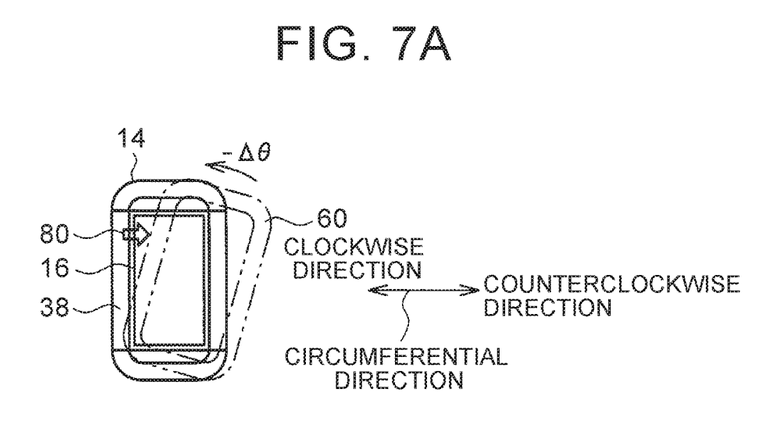
FIG. 7A is a view showing a reaction force that is generated when the cassette coil in FIG. 5B is attached to the stator core.

FIG. 7A is a view of an action that is exerted when the cassette coil 60 is attached to the outer side surface of the insulator 16 while the twisting angle Δθ, which is the shift amount of the wire shape of each of the turns, is canceled. In regard to the pre-attachment cassette coil 60, twisting angle cancellation of (−Δθ) is performed thereon from a state of having the twisting angle Δθ. In this way, the cassette coil 60 becomes the post-attachment cassette coil 14. The cassette coil 60 has a property as the coil spring. Thus, the cassette coil 60 is elastically deformed by the twisting angle cancellation of (−Δθ), and the elastic reaction force thereof is applied to the step 48 of the insulator 16. With the elastic reaction force, the cassette coil 14 is fixed to the insulator 16 and is fixed to the stator core 12. The same applies to the cassette coil 61.

Figure 7B:
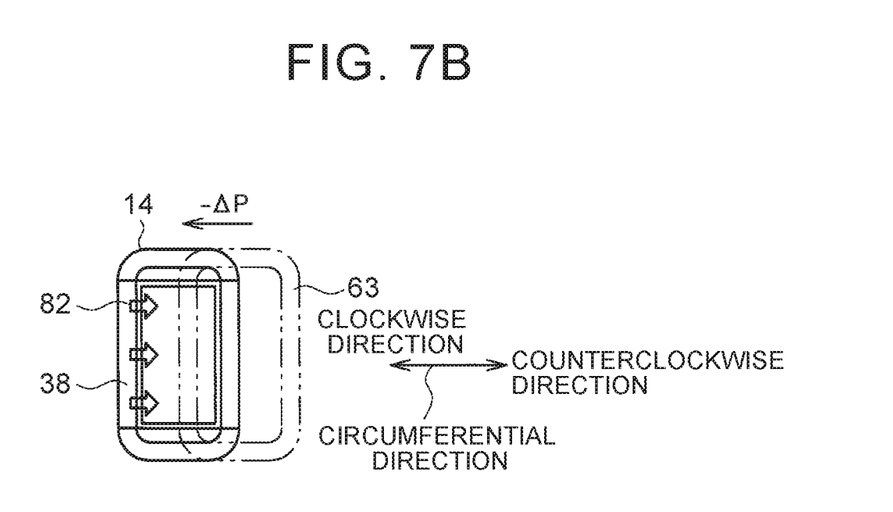
FIG. 7B is a view showing a reaction force that is generated when the cassette coil in FIG. 6 is attached to the stator core.

FIG. 7B is a view of an action that is exerted when the cassette coil 63 is attached to the outer side surface of the insulator 16. In regard to the pre-attachment cassette coil 63, displacement amount cancellation of (−ΔP) is performed thereon from a state of having the displacement amount ΔP. In this way, the cassette coil 63 becomes the post-attachment cassette coil 14. The cassette coil 63 has a property as the coil spring. Thus, the cassette coil 63 is elastically deformed by the displacement amount cancellation of (−ΔP), and the elastic reaction force thereof is applied to the step 48 of the insulator 16. With the elastic reaction force, the cassette coil 14 is fixed to the insulator 16 and is fixed to the stator core 12.

The elastic reaction force is a force that attempts to cancel elastic deformation caused by the cancellation of the specified shift amount. In both of the case of FIG. 7A and the case of FIG. 7B, a direction of the specified shift amount is the counterclockwise direction with respect to the circumferential direction. Accordingly, a direction of the elastic deformation that cancels the shift amount is the clockwise direction with respect to the circumferential direction. Thus, a direction of the elastic reaction force as a direction in which the elastic deformation is attempted to be canceled is the counterclockwise direction with respect to the circumferential direction. This elastic reaction force in the counterclockwise direction with respect to the circumferential direction is applied to the insulator 16 by the side of the wire shape of the cassette coil 14 on the clockwise direction side with respect to the circumferential direction among the two sides thereof that are parallel to the axial direction. FIG. 7A shows an elastic reaction force 80, and FIG. 7B shows an elastic reaction force 82. With these elastic reaction forces 80, 82, the cassette coil 14 is fixed to the insulator 16 and is fixed to the stator core 12.

Magnitudes of the elastic reaction forces 80, 82 that are required to fix the cassette coil 14 to the stator core 12 are defined in accordance with specifications of the rotary electric machine, such as an operation environment. In order to generate the elastic reaction forces 80, 82 in the defined magnitudes, the width $W_0$ and the thickness $t_0$ of the rectangular wire as well as the rigidity of the material, the wire shape, the number of turns, the twisting angle $\Delta\theta$, the displacement amount $\Delta P$, and the like of the rectangular wire are set.

Returning to FIG. 4, the process in S16 is performed for each of the insulators 16 that are respectively fitted to the teeth 22 of the stator core 12. When the process in S16 is finished for all of the teeth 22, as indicated in FIG. 1, the winding terminals of the cassette coils 14 are connected to each other by the specified connection method, and the specified wire coils in the rotary electric machine are formed (S18).

In the above description, the insulator 16 is used. However, in the case where the electrical insulation performance of the cassette coil 14 is sufficient and the insulator 16 need not be used, the process in S12 is skipped. In S16, the pre-attachment cassette coil 60 and the like are directly attached to an outer circumferential surface of the tooth 22. In this case, the elastic reaction force that is generated by the cancellation of the specified shift amount is directly applied from the cassette coil 14 to the tooth 22. In this way, the cassette coil 14 is fixed to the tooth 22 of the stator core 12.

Here, the embodiment will be summarized. The method for manufacturing the stator of the rotary electric machine includes steps of: forming the stator core having plural teeth; forming the cassette coil by using and concentrically winding the rectangular wire for the specified number of turns, the cassette coil being formed by applying the specified shift amount with respect to the axis in the winding direction to a wire shape of at least one of the turns before being attached to the stator core; arranging an insulator on an outer circumferential side surface of the tooth, the insulator having a cylindrical shape that is held between an inner circumferential side surface of the cassette coil and the outer circumferential side surface of the tooth that opposes the inner circumferential side surface of the cassette coil and being provided with a step on an outer side surface of the cylindrical shape corresponding to an inner circumferential side surface of each of the turns of the rectangular wire; and bringing the inner circumferential side surface of each of the turns of the rectangular wire into contact with the step of the insulator while canceling the shift amount, and attaching the cassette coil.

What is claimed is:

1. A method for manufacturing a stator of a rotary electric machine, the stator including a stator core and a wire coil, the method comprising:
    providing the stator core including teeth that are projected from an annular stator yoke to a radially inner side;
    forming each cassette coil of a plurality of cassette coils by concentrically winding a rectangular wire for a specified number of turns, wherein the rectangular wire of each cassette coil has a starting end and a finish end, and applying a shift amount, with respect to an axis in a winding direction, to a wire shape of at least one of the specified number of turns before each cassette coil is attached to the teeth of the stator core;
    attaching each cassette coil of the plurality of cassette coils to each of the teeth of the stator core, while eliminating the shift amount of each cassette coil of the plurality of cassette coils, thereby causing a reactionary force between each cassette coil of the plurality of cassette coils and each of the teeth; and
    forming the wire coil by connecting adjacent ones of the cassette coils of a same phase to each other by connecting the starting end of the rectangular wire of one of the plurality of cassette coils to the finish end of the rectangular wire of an adjacent one of the plurality of cassette coils of the same phase until each of the cassette coils is connected to form the wire coil.

2. The method according to claim 1, wherein
the shift amount of the wire shape is a magnitude of a twisting angle of the wire shape with respect to the axis in the winding direction.

3. The method according to claim 1, wherein
the shift amount of the wire shape is a displacement amount of the wire shape along a circumferential direction of the stator core with respect to the axis in the winding direction.

* * * * *